US007054476B2

United States Patent
Oosawa et al.

(10) Patent No.: US 7,054,476 B2
(45) Date of Patent: May 30, 2006

(54) APPARATUS FOR AUTOMATICALLY SETTING MEASUREMENT REFERENCE ELEMENT AND MEASURING GEOMETRIC FEATURE OF IMAGE

(75) Inventors: Akira Oosawa, Kaisei-machi (JP); Takefumi Nagata, Kaisei-machi (JP); Kazuo Shimura, Kaisei-machi (JP); Takeshi Ohkubo, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 733 days.

(21) Appl. No.: 09/985,828

(22) Filed: Nov. 6, 2001

(65) Prior Publication Data

US 2002/0057828 A1 May 16, 2002

(30) Foreign Application Priority Data

Nov. 6, 2000 (JP) .............................. 2000-336859
May 30, 2001 (JP) .............................. 2001-161669

(51) Int. Cl.
*G06K 9/00* (2006.01)
(52) U.S. Cl. ...................... 382/132; 382/201; 382/286; 600/425
(58) Field of Classification Search ................ 382/128, 382/132, 286, 201, 131, 141, 217, 203, 204, 382/287, 289; 600/425; 377/10; 702/26, 702/66, 155; 128/922; 356/39, 3, 600, 614; 345/582; 351/204; 250/202
See application file for complete search history.

(56) References Cited

U.S. PATENT DOCUMENTS

| 4,258,264 A | 3/1981 | Kotera et al. ............... 250/484 |
| 4,276,473 A | 6/1981 | Kato et al. ................ 250/327.1 |
| 4,315,318 A | 2/1982 | Kato et al. .................... 364/515 |
| 4,387,428 A | 6/1983 | Ishida et al. ................. 364/414 |
| 5,072,384 A * | 12/1991 | Doi et al. .................... 382/132 |
| 5,080,109 A * | 1/1992 | Arme, Jr. .................... 600/595 |
| 5,159,557 A * | 10/1992 | Ogawa ....................... 701/300 |
| 5,272,760 A * | 12/1993 | Echerer et al. ............. 382/132 |
| 5,434,026 A * | 7/1995 | Takatsu et al. ............... 430/30 |
| 5,483,960 A * | 1/1996 | Steiger et al. .............. 600/425 |
| 5,926,568 A * | 7/1999 | Chaney et al. .............. 382/217 |
| 6,621,917 B1 * | 9/2003 | Vilser ......................... 382/128 |
| 6,640,002 B1 * | 10/2003 | Kawada ....................... 382/141 |
| 2002/0048394 A1 * | 4/2002 | Nagata et al. .............. 382/132 |

FOREIGN PATENT DOCUMENTS

JP          56-11395          2/1981

OTHER PUBLICATIONS

Japanese Abstract 56011395.
"A Guide to X-ray Image Measurement in Orthopedic Surgery" 1990.

(Continued)

*Primary Examiner*—Barry Choobin
(74) *Attorney, Agent, or Firm*—Sughrue Mion, PLLC

(57) ABSTRACT

In a measurement processing apparatus for measuring a geometric feature of an object image: a measurement-reference-element setting unit automatically sets at least one first measurement reference element for use in measurement of the geometric feature of the object image, at at least one first position on the object image based on first image data representing the object image and position information indicating at least one second position of at least one second measurement reference element which is set on a measurement reference image corresponding to the object image; and a geometric-feature measurement unit measures the geometric feature of the object image based on the at least one first position of the at least one first measurement reference element.

8 Claims, 6 Drawing Sheets

OTHER PUBLICATIONS

Lien, J. J-J, et al.: "Detection, tracking, and classification of acion units in facial expression" Robotocs and Autonomous Systems, vol. 31, No. 3, May 1, 2000, pp. 131-146 (XP004197692).

Fu, J.H., et al.: "Tracking of multiple faces for human-computer interfaces and virtual enviroments" Multimedia and Expo, vol. 3, Jul. 30, 2000, pp. 1563-1566 (XP010512805), New York, USA.

Matsumoto, Y., et al.: Automatic Face and Gesture Recognition, Mar. 28, 2000, pp. 499-504 (XP010378305), Grenoble, France.

* cited by examiner

APPARATUS FOR AUTOMATICALLY SETTING MEASUREMENT REFERENCE ELEMENT AND MEASURING GEOMETRIC FEATURE OF IMAGE

BACKGROUND OF THE INVENTION

1. Field of the Invention

The present invention relates to a measurement processing apparatus for automatically measuring a geometric feature of an image based on at least one measurement reference element set on the image. For example, the image may be a medical image, and the geometric feature may be a distance between measurement reference points, or an angle between lines determined by measurement reference points.

2. Description of the Related Art

Recently, the computed radiography (CR) has become commercially practical as a technique for obtaining a radiographic image having an extremely broad radiation exposure range, and is currently used for diagnosis in the medical field. The current CR systems use a stimulable phosphor (accelerated phosphorescent material), which stores a portion of radiation energy when the stimulable phosphor is irradiated with a radiation such as X rays, and emits accelerated phosphorescent light having energy corresponding to the stored radiation energy when excitation light such as visible light or infrared light is applied to the stimulable phosphor. That is, in the current CR systems, a radiographic image of an object such as a human body is recorded in a stimulable phosphor sheet, and the stimulable phosphor sheet is scanned with excitation light so that accelerated phosphorescent light is emitted from the stimulable phosphor sheet. Then, the accelerated phosphorescent light is optically read by a photomultiplier or the like so that a digital image signal is generated, Finally, based on the digital image signal, the radiographic image of the object is recorded as a visible image in a recording medium such as a film made of a photosensitive material or displayed by a display device such as a CRT monitor. Such CR systems are disclosed in, for example, Japanese Unexamined Patent Publication No. 56(1981)-11395 and U.S. Pat. Nos. 4,258,264, 4,387,428, 4,276,473 and 4,315,318 respectively corresponding to Japanese Unexamined Patent Publication Nos. 55(1980)-12429, 56(1981)-104645, 55(1980)-116340, and 55(1980)-163472.

However, in some medical fields such as orthopedics, the radiographic images are not only observed, but also used for measuring a geometric feature such as a scoliotic curvature of a spine (by the Cobb method or the Ferguson method), a backward bending (kyphotic) index, an ulnar deviation, or a radial rotation. For example, as explained by Kazuo Hiroshima and Kazuo Yonenobu in "A Guide to X-ray Image Measurement in Orthopedic Surgery," Kanehara Co., Ltd., 1990 (in Japanese), measurement of a geometric feature is conventionally made as follows.

First, measurement reference points are manually marked with a red pencil or the like on a film in which a radiographic image is recorded, and at least one geometric quantity such as distances between the measurement reference points or an angle between two lines connecting the measurement reference points is manually measured by using a measurement tool such as a ruler or protractor. Thereafter, a geometric feature such as a ratio between the distances, an area of a polygon determined by the measurement reference points, or the scoliotic curvature is obtained by calculation. That is, conventionally, geometrical analysis of a radiographic image is manually made.

For example, in the case of diagnosis of cardiomegaly, widths of a ribcage and a heart are measured in a radiographic chest image, and a diagnosis of cardiomegaly is made based on the cardio-thoracic ratio (i.e., a ratio between the widths of the heart and the ribcage). In this case, a doctor or a radiography technician is required to manually measure the widths of the ribcage and the heart by using a ruler or the like on the radiographic image, and calculate the cardio-thoracic ratio based on the measured values of the widths of the ribcage and the heart.

On the other hand, since radiographic images obtained by the CR systems are represented by digital image signals, it has been considered that if measurement of geometric features is automatically made, the load imposed on the doctor or the radiography technician during the measurement can be greatly reduced. That is, if geometric features to be measured (e.g., the scoliotic curvature or the cardio-thoracic ratio) and methods of measurement (e.g., calculation methods of the scoliotic curvature or the cardio-thoracic ratio) are stored in advance, and a radiographic image is displayed on a screen of an image display device such as a CRT monitor, and a user sets measurement reference points on the radiographic image on the screen, measurement of the scoliotic curvature or the cardio-thoracic ratio can be automatically made.

However, even when calculation of a geometric feature is automatically made as above, a user is still required to manually set measurement reference points on the screen, for example, with reference to a manual in which the methods of measurement or orders of setting of the measurement reference points are indicated. Therefore, conventionally, the efficiency of measurement of a geometric feature of an image and diagnosis based on the measurement is low.

SUMMARY OF THE INVENTION

An object of the present invention is to provide a measurement processing apparatus which relieves users from the burden of manual setting of measurement reference points, and enables automatic measurement of a geometric feature of an image.

According to the present invention, there is provided a measurement processing apparatus for measuring a geometric feature of an object image. The measurement processing apparatus includes a measurement-reference-element setting unit and a geometric-feature measurement unit. The measurement-reference-element setting unit automatically sets at least one first measurement reference element for use in measurement of the geometric feature of the object image, at at least one first position on the object image based on first image data representing the object image and position information indicating at least one second position of at least one second measurement reference element which is set on a measurement reference image corresponding to the object image. The geometric-feature measurement unit measures the geometric feature of the object image based on the at least one first position of the at least one first measurement reference element.

Each of the at least one measurement reference element may be a point or the like which is set on an image based on which a geometric feature of the image can be measured. For example, a line segment, a center line, or the like can be determined based on the at least one measurement reference element. That is, each of the at least one measurement reference element is not limited to a point. For example, the at least one measurement reference element may be a straight line, a region of interest having a rectangular shape, or a circle, where the straight line can be moved or rotated by a user with a mouse or the like, and the width of the region of interest or the diameter of the circle can be determined (or set) by the user with the mouse or the like.

The measurement reference image may be any image which can be used as a reference when the at least one measurement reference element is automatically set on the object image. For example, the measurement reference image may be a typical (representative) image which covers the same body part as the object image, where the object of the typical image may not be identical to that of the object image.

According to the present invention, the at least one first measurement reference element corresponding to the at least one second measurement reference element on the measurement reference image can be automatically set on the object image without the user's manipulation. Therefore, the automatic measurement of the geometric feature of the object image can be efficiently made.

Preferably, the measurement processing apparatus according to the present invention may also have one or any possible combination of the following additional features (i) to (x).

(i) The measurement-reference-element setting unit may set in advance a region of interest including a third position on the object image corresponding to each of the at least one second position, and may automatically set one of the at least one first measurement reference element in the region of interest. In this case, the operation of searching for the position at which each of the at least one first measurement reference element should be set becomes easier.

For example, the third position on the object image corresponding to each of the at least one second position is the position on the object image having the same coordinates as the coordinates of each of the at least one second measurement reference element on the measurement reference image. In addition, the region of interest has a predetermined size which is appropriately determined by a predetermined processing algorithm for automatically setting the at least one first measurement reference element. The region of interest may be automatically set by the measurement-reference-element setting unit. Alternatively, the region of interest having the predetermined size may be manually set by the user's manipulation of a mouse so that the region of interest includes the above third position.

(ii) The measurement-reference-element setting unit may align in advance the object image with the measurement reference image before the measurement-reference-element setting unit automatically sets the at least one first measurement reference element. In this case, the operation of searching for the position at which each of the at least one first measurement reference element should be set becomes further easier.

The object image and the measurement reference image can be aligned by using any known method, for example, an affine transformation, which realizes translation and rotation.

(iii) The measurement reference image may be an image on which the geometric feature has been previously measured. Hereinafter, the image on which the geometric feature has been previously measured is referred to as a previously-measured image.

When the measurement processing apparatus according to the present invention has the additional feature (iii), an image which is taken after the object image is taken may be used as the measurement reference image.

In order to observe progression of a disease, it is preferable to use a previously-measured image as the measurement reference image, and further preferable that the previously-measured image covers the same body part of the same patient as the object image. For example, it is possible to take a plurality of images of an identical object at a plurality of different times so as to form a time series. Although measurement of the geometric feature in a plurality of images is usually made in the same order as the order in which the plurality of images are taken, the plurality of images may be measured in a different order from the order in which the plurality of images are taken.

In the case where measurement of a geometric feature is made on a plurality of radiographic images of an identical object which are taken at a plurality of different times so as to form a time series, and a progression of a disease is determined by comparing a plurality of measurement results obtained from the plurality of radiographic images, first measurement reference points can be automatically set on a first radiographic image which is to be currently measured based on second measurement reference points which have been set on a second radiographic image which has been previously measured, by automatically detecting differences (e.g., in shapes and curvatures of bones) between the first and second radiographic images, since the differences are small, i.e., the positions on the first radiographic image at which the first measurement reference points should be set are respectively in vicinities of positions corresponding to the positions on the second radiographic image at which the second measurement reference points have been set.

It is possible to use more than one measurement reference image as a reference based on which the measurement reference points are set on the object image. However, it is not preferable to use too many measurement reference images as a reference, and it is rather preferable to use only one measurement reference image as a reference based on which the measurement reference points are set on the object image.

In a special case, it is possible to use all of a plurality of previously-measured images of an identical object as the more than one measurement reference image. In this case, all of the plurality of previously-measured images may be aligned so that all of the plurality of previously-measured images are superimposed on each other.

(iv) The measurement processing apparatus according to the present invention may further comprise a storage unit which stores the position information and second image data representing the measurement reference image in a predetermined storage medium so that the position information is linked with the second image data, and the measurement-reference-element setting unit may read out the position information and the second image data from the predetermined storage medium, and automatically set the at least one first measurement reference element based on the second image data as well as the first image data and the position information.

It is convenient to provide the above storage unit since the measurement reference image can be read out from the storage unit when the measurement reference image is used for automatically setting the at least one first measurement reference element.

For example, in the case where a plurality of images are taken for observing progression of a disease, at least one previously-measured image as the measurement reference image can be stored in the storage unit together with the position information.

Further, it is possible to store setting order information indicating the order of setting of the at least one first measurement reference element on the object image, as well as the position information, so that the setting order information is linked with information on the at least one first measurement reference element. In this case, the measurement-reference-element setting unit automatically sets the at least one first measurement reference element in the order indicated in the setting order information.

(v) The measurement-reference-element setting unit may obtain a first portion of the object image corresponding to a second portion of the measurement reference image located in a vicinity of each of the at least one second measurement reference element by using pattern matching processing, and automatically set each of the at least one first measurement reference element at a position on the first portion of the object image corresponding to one of the at least one second measurement reference element. That is, the measurement-reference-element setting unit determines the position of each of the at least one first measurement reference element on the object image by performing pattern matching between the object image and the second portion of the measurement reference image located in a vicinity of each of the at least one second measurement reference element. In this case, the pattern matching can be performed after the second portion of the measurement reference image is cut out from the measurement reference image. Therefore, the search range in the pattern matching processing is reduced, and thus the pattern matching processing can be performed in a short time.

When the measurement processing apparatus according to the present invention has the additional feature (v), the setting of the at least one first measurement reference element becomes easier and more accurate.

(vi) The measurement-reference-element setting unit may search for an edge in a vicinity of a third position on the object image corresponding to each of the at least one second measurement reference element, and automatically set each of the at least one first measurement reference element based on information on the edge.

In this case, it becomes easier to find the at least one first position of the at least one first measurement reference element. Therefore, the processing speed in measurement of the geometric feature can be increased.

For example, when each of the object image and the measurement reference image is a chest image, and the geometric feature is a cardio-thoracic ratio, two measurement reference points for determining the maximum distance between the right and left ribcage edges (i.e., the maximum diameter of a ribcage), and two other measurement reference points for determining the maximum distance between the right and left edges of a heart (i.e., the maximum diameter of the heart) are obtained.

Further, when a curved template constituted by a plurality of constituent points is set as a measurement reference element, and the measurement-reference-element setting unit fails to find an edge corresponding to a portion of the plurality of constituent points, the measurement-reference-element setting unit may estimate a shape of the edge based on positions of edges corresponding to other portions of the plurality of constituent points which are found by the measurement-reference-element setting unit.

As described above, when the measurement processing apparatus according to the present invention has the additional feature (vi), the processing speed in the measurement of the cardio-thoracic ratio can be particularly increased.

(vii) Each of the object image and the measurement reference image may be a chest image, and the geometric feature may be a cardio-thoracic ratio.

(viii) The measurement processing apparatus according to the present invention may further comprise a display unit which allows the user to confirm the at least one first position of the at least one first measurement reference element which is automatically set on the object image, and a measurement-reference-element modification unit which facilitates modification of the at least one first position of the at least one first measurement reference element by the user. In this case, when the user determines that the at least one first position of the at least one first measurement reference element which is automatically set on the object image is not appropriate, the user can modify the at least one first position of the at least one first measurement reference element. The measurement-reference-element modification unit may comprise a pointing device such as a mouse.

(ix) The measurement-reference-element modification unit may store in advance an algorithm (measurement program) for automatic measurement of the geometric feature such as a distance between measurement reference points or an angle between intersecting lines, according to the purpose of measurement. Thus, a scoliotic curvature of a spine, a cardio-thoracic ratio, or the like can be automatically obtained.

(x) The at least one second measurement reference element may be indicated (embedded) in the measurement reference image. For example, when the measurement processing apparatus according to the present invention has the additional feature (iii), it is preferable that the at least one second measurement reference element based on which the previously-measured image has been measured is indicated (embedded) in the previously-measured image.

DESCRIPTION OF PREFERRED
EMBODIMENTS

An embodiment of the present invention is explained in detail below with reference to drawings.

Construction of Embodiment

Figure 1:
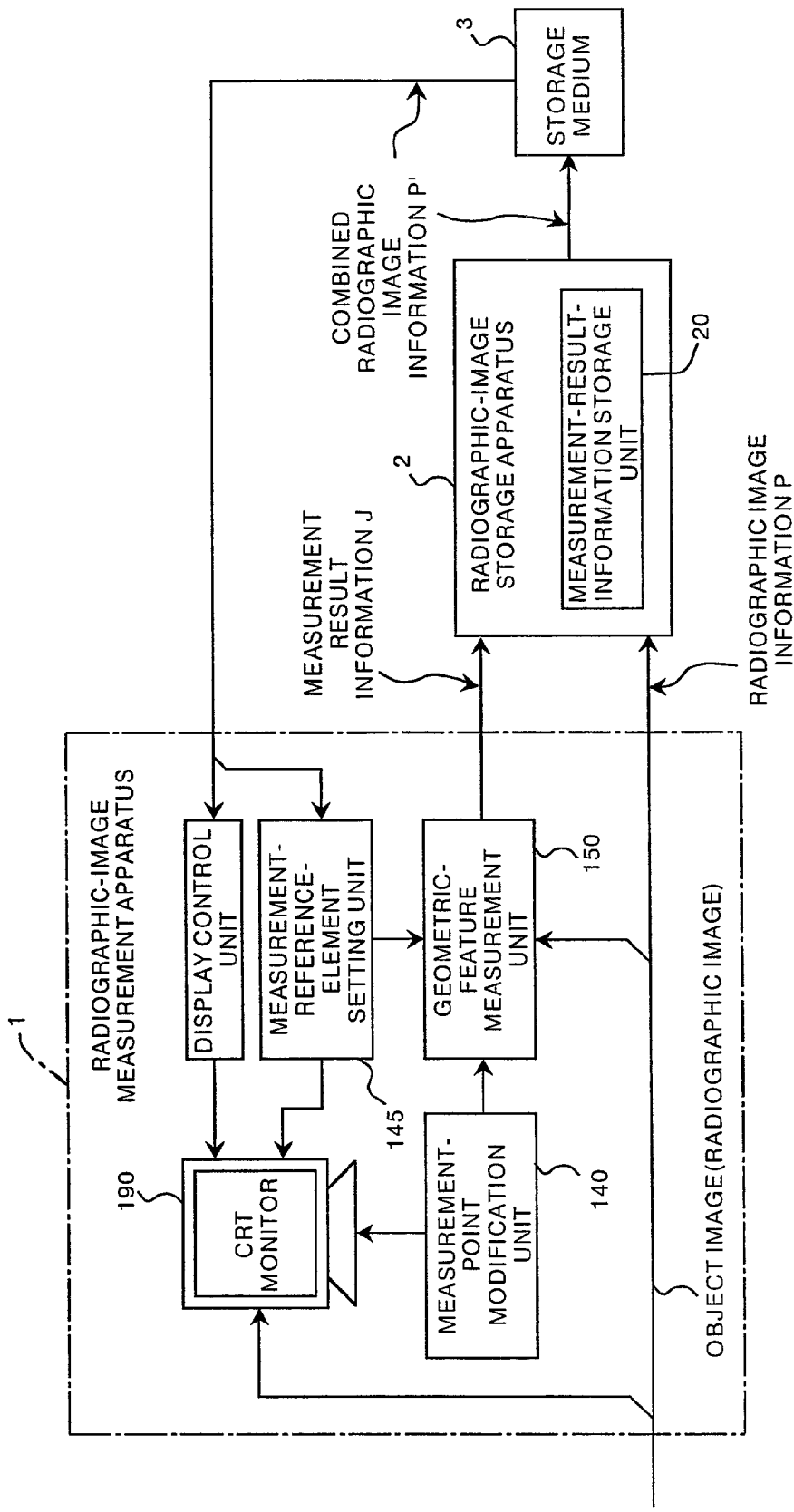
FIG. 1 is a block diagram illustrating an outline of a construction of an image measurement system, which includes a radiographic-image measurement apparatus as an embodiment of the measurement processing apparatus according to the present invention.

FIG. 1 is a block diagram illustrating an outline of a construction of an image measurement system, which includes a radiographic-image measurement apparatus as an embodiment of the measurement processing apparatus according to the present invention. The image measurement system of FIG. 1 also comprises a radiographic-image storage apparatus 2 as well as the radiographic-image measurement apparatus 1.

The radiographic-image measurement apparatus 1 receives a radiographic image as an object image, and measures a geometric feature of the radiographic image by measurement. The radiographic-image storage apparatus 2 stores in a predetermined storage medium 3 geometric information (i.e., information on the geometric feature) which is obtained by the radiographic-image measurement apparatus 1, in such a manner that the geometric information is linked with the radiographic image from which the geometric information has been obtained by the measurement. Hereinafter, a radiographic image from which geometric information has been previously obtained by measurement is called a previously-measured image.

In this embodiment, two radiographic images of an identical object which are taken at different times for observing variations of the object are handled. For example, the first radiographic image which is first obtained is measured in advance. Thereafter, when the second radiographic image is obtained, the second radiographic image is measured, and the result of the measurement of the second radiographic image is compared with the result of the measurement of the first radiographic image. That is, in this embodiment, the previously obtained radiographic image is used as the previously-measured image.

The radiographic-image storage apparatus 2 includes a measurement-result-information storage unit 20. The measurement-result-information storage unit 20 receives radiographic image information P and measurement result information J, generates combined radiographic image information P', and stores the combined radiographic image information P' in the storage medium 3. Details of the radiographic-image storage apparatus 2 are explained in Japanese Unexamined Patent Publication No. 2000-342564, which is assigned to the assignee of the present patent application, and the contents of which are incorporated in this specification by reference.

The radiographic image information P is radiographic image data representing a radiographic image which has been measured, and includes at least one measurement reference element based on which the measurement has been made. The measurement result information J includes position information, setting order information, and a result of the measurement which is made based on the at least one measurement reference element. The position information indicates at least one position of the at least one measurement reference element which is set by the radiographic-image measurement apparatus 1 (in accordance with designation by a user), and the setting order information indicates an order of setting of the at least one measurement reference element. In the combined radiographic image information P', the measurement result information J is linked with the radiographic image information P. For example, the measurement result information J may be attached to the radiographic image information P as additional information, or embedded in the radiographic image information P so as to correspond to at least one measurement position on the radiographic image.

The previously-measured image is used as an example of the aforementioned measurement reference image. It is preferable to indicate, in the radiographic image, at least one measurement reference element based on which the measurement of the previously-measured image has been made and an order of setting of the at least one measurement reference element so that a user can easily and accurately recognize at least one measurement position on the previously-measured image when the current object image is measured. Hereinafter, a measurement reference element based on which measurement of a previously-measured image has been made is referred to as a previously-set measurement reference element.

For example, in the radiographic image information P, visible information indicating the at least one measurement reference element may be embedded in the previously-measured radiographic image, and the combined radiographic image information P' may be generated by using the radiographic image information P in which the visible information is embedded.

The measurement-result-information storage unit 20 may be arranged to store both the radiographic image information P and the measurement result information J in a storage medium. Alternatively, the measurement-result-information storage unit 20 may be arranged to link the measurement result information J with the radiographic image information P, and separately store the radiographic image information P and the measurement result information J in different storage mediums.

As illustrated in FIG. 1, the radiographic-image measurement apparatus 1 comprises a measurement-reference-element setting unit 145 and a geometric-feature measurement unit 150. The measurement-reference-element setting unit 145 automatically sets at least one measurement reference element on an object image which is input into the radiographic-image measurement apparatus 1, in accordance with the purpose of the measurement. The geometric-feature measurement unit 150 automatically measures at least one geometric feature of the object image based on the position information indicating at least one position of the at least one measurement reference element which is set on the object image.

In particular, the measurement-reference-element setting unit 145 is arranged to automatically set the at least one measurement reference element on the object image, based on radiographic image data representing the object image and position information indicating at least one position of at least one measurement reference element which has been set on a previously-measured image for measuring at least one geometric feature of the previously-measured image, where the previously-measured image is one of at least one previously-measured image which covers approximately the same region of the same object as the object image which is currently input into the radiographic-image measurement apparatus 1.

In addition, the geometric-feature measurement unit 150 stores in advance a measurement program corresponding to the purpose of the measurement in a read-only memory (ROM), and automatically measures a geometric feature of the object image in accordance with the purpose of the measurement. The geometric feature may be the scoliotic curvature of a spine, the backward bending (kyphotic) index, the ulnar deviation, the radial rotation, the cardio-thoracic ratio, or the like.

Details of an example of the radiographic-image measurement apparatus 1 in the image measurement system of FIG. 1 are explained below with reference to FIG. 2, which is a block diagram illustrating the details of the example of the radiographic-image measurement apparatus 1. In the example explained below, it is assumed that the measurement-reference-element setting unit 145 automatically sets a plurality of measurement reference points as the at least one measurement reference point.

Figure 2:
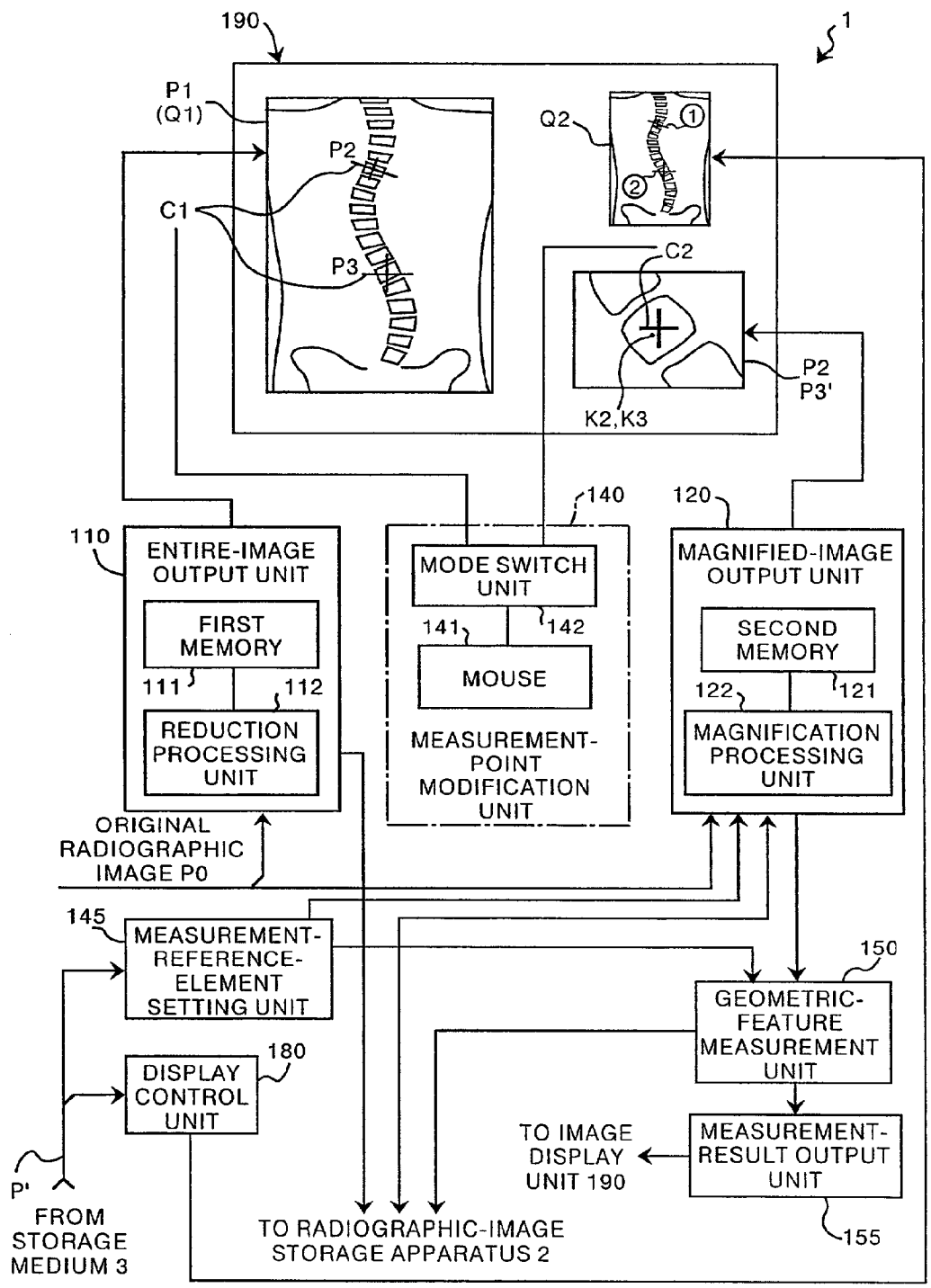
FIG. 2 is a block diagram illustrating details of an example of the radiographic-image measurement apparatus in the image measurement system of FIG. 1.

As illustrated in FIG. 2, the radiographic-image measurement apparatus 1 further comprises an entire-image output unit 110, a magnified-image output unit 120, a measurement-point modification unit 140, a measurement-result output unit 155, a display control unit 180, and an image display unit 190.

The image display unit 190 displays an image, and is realized by, for example, a CRT monitor. The user can view the image when the user modifies the plurality of measurement reference points after the plurality of measurement reference points are automatically set by the measurement-reference-element setting unit 145. The measurement-point modification unit 140 modifies positions of the plurality of measurement reference points displayed on a screen of the image display unit 190, in accordance with manipulation of a pointing device such as a mouse by the user. The display control unit 180 controls the image display unit 190 so that the image display unit 190 displays an object image and a previously-measured image in a predetermined manner.

In particular, the display control unit 180 is arranged to make the image display unit 190 display near the object image Q1 the previously-measured image Q2, which has been measured in advance of the measurement of the object image Q1. Alternatively, the object image Q1 and the previously-measured image Q2 may be aligned to and superimposed on each other in such a manner that each of the plurality of measurement reference points on the object image Q1 and one of the plurality of measurement reference points on the previously-measured image Q2 corresponding to the measurement reference point on the object image Q1 are displayed on an approximately identical position on the screen of the image display unit 190. Further, it is possible to switch between the object image Q1 and the previously-measured image Q2 after these images are aligned as above.

In addition, in the radiographic-image measurement apparatus 1, the entire-image output unit 110 receives as an object image Q1 an original image P0 containing a plurality of measurement reference points based on which measurement of a desired geometric feature is to be made, reduces the original image P0 so as to produce a reduced image P1, and controls the image display unit 190 so as to display the entire reduced image P1 in the left area of the screen of the image display unit 190. In the example illustrated in FIG. 2, the original image P0 covers a spine of a human body.

Further, the measurement-point modification unit 140 controls the image display unit 190 so as to display a first cross-shaped cursor C1 on the reduced image P1, and the magnified-image output unit 120 displays magnified partial images P2 and P3 in the right area of the screen of the image display unit 190. The first cross-shaped cursor C1 points to a point on the reduced image P1 displayed on the screen. Each of the magnified partial images P2 and P3 is a portion of the original image P0 which is magnified by a magnification processing unit 122 in the magnified-image output unit 120, and includes each point pointed to by the first cross-shaped cursor C1 and a vicinity of the point.

The measurement-point modification unit 140 further controls the image display unit 190 so as to display a second cross-shaped cursor C2 on each of the magnified partial images P2 and P3, where the second cross-shaped cursor C2 is used for setting measurement reference points K2 and K3 on the magnified partial images P2 and P3. Based on the positions of the measurement reference points K2 and K3, the geometric-feature measurement unit 150 calculates a measurement result in accordance with a predetermined measurement algorithm, which is stored in the ROM in the geometric-feature measurement unit 150. For example, the measurement result is a distance between the measurement reference points K2 and K3. The measurement-result output unit 155 controls the image display unit 190 so as to display the measurement result in such a manner that the measurement result is superimposed on the reduced image P1.

The measurement-point modification unit 140 comprises a mouse 141 and a mode switch unit 142. The mode switch unit 142 changes the mode of movement of the first and second cross-shaped cursors C1 and C2 between a designation mode M1 and a setting mode M2. In the designation mode M1, when the first cross-shaped cursor C1 is moved on the reduced image P1, the second cross-shaped cursor C2 on each of the magnified partial images P2 and P3 automatically moves with the movement of the first cross-shaped cursor C1 by an amount determined by the ratio between the magnification ratio in the magnified-image output unit 120 and the reduction ratio in the entire-image output unit 110. On the other hand, in the setting mode M2, when the second cross-shaped cursor C2 is moved on one of the magnified partial images P2 and P3, the first cross-shaped cursor C1 on the reduced image P1 automatically moves with the movement of the second cross-shaped cursor C2 by an amount determined by the ratio between the magnification ratio in the magnified-image output unit 120 and the reduction ratio in the entire-image output unit 110.

The mouse 141 constitutes a man-machine interface for moving the first and second cross-shaped cursors C1 and C2 in each of the designation mode M1 and setting mode M2.

The entire-image output unit 110 comprises a first memory 111 and a reduction processing unit 112. The reduction processing unit 112 reduces the original image P0 which is input as the object image Q1, and the first memory 111 stores the reduced image P1.

The magnified-image output unit 120 comprises a second memory 121 and the aforementioned magnification processing unit 122. The magnification processing unit 122 magnifies the original image P0, and the second memory 121 stores the magnified original image P0.

Figure 3:
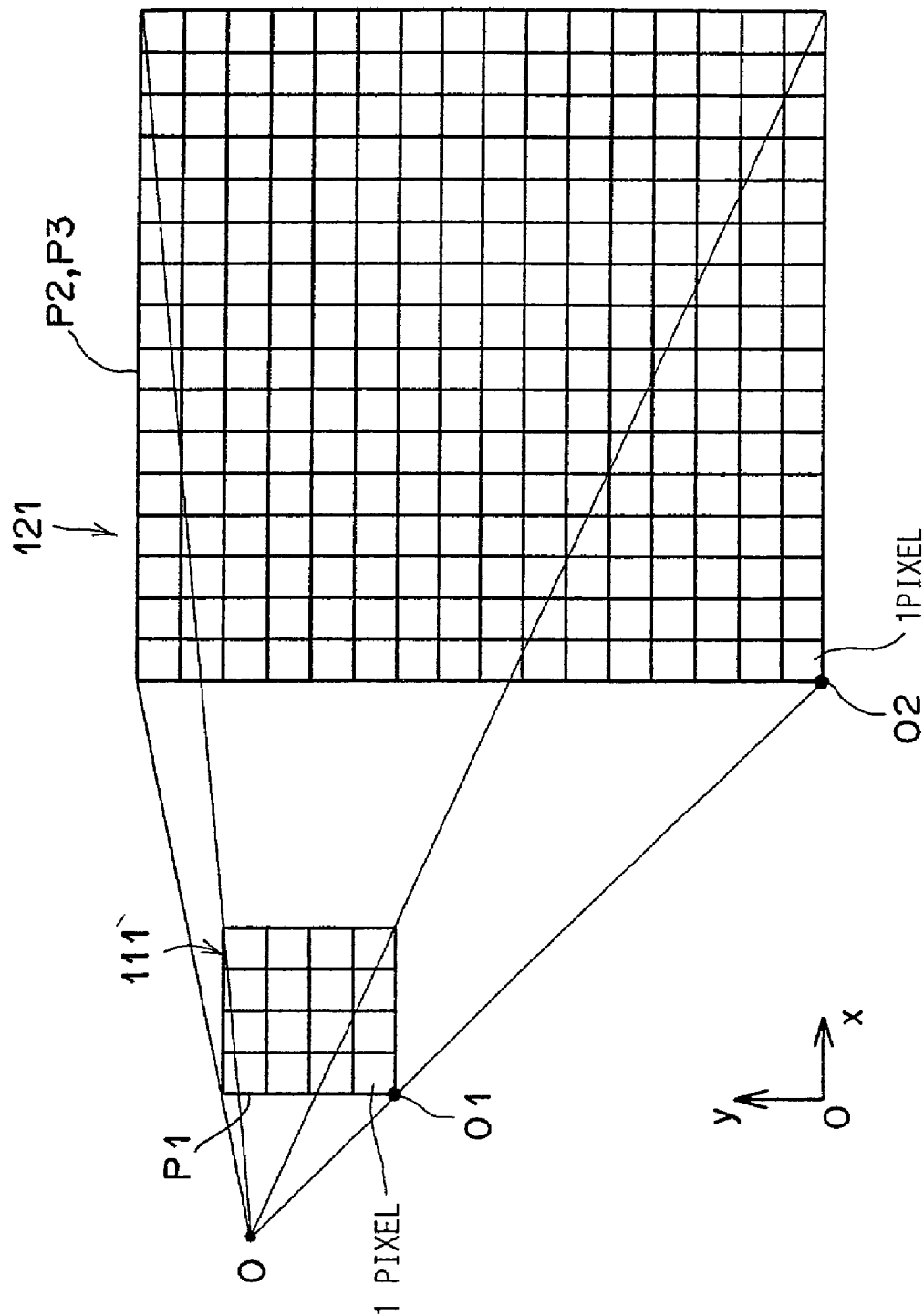
FIG. 3 is a diagram schematically illustrating an example of a relationship between storage locations of data in the first and second memories 111 and 121.

The storage locations, in the first memory 111, of data of respective pixels of the reduced original image P0 with respect to its origin O1 and the storage locations, in the second memory 121, of data of respective pixels of the magnified original image P0 with respect to its origin O2 are related to each other according to the ratio between the magnification ratio in the magnified-image output unit 120 and the reduction ratio in the entire-image output unit 110. FIG. 3 schematically shows an example of a relationship between the storage locations, in the first memory 111, of the data of the respective pixels of the reduced original image P0 with respect to its origin O1 and the storage locations, in the second memory 121, of the data of the respective pixels of the magnified original image P0 with respect to its origin O2, in the case where the ratio between the magnification ratio in the magnified-image output unit 120 and the reduction ratio in the entire-image output unit 110 is four. That is, in the example of FIG. 3, the width of each pixel of the reduced original image P0 the data of which is stored in the first memory 111 corresponds to the width of four pixels of the magnified original image P0 the data of which is stored in the second memory 121. Therefore, when the first cross-shaped cursor C1 is moved by one pixel on the reduced image P1, each of the magnified partial images P2 and P3 is scrolled by four pixels.

Operations

The operations of the radiographic-image measurement apparatus 1 are explained below.

First, the original image P0 as an object image Q1 is input into each of the entire-image output unit 110 and the magnified-image output unit 120. The original image P0 input into the entire-image output unit 110 is reduced by the reduction processing unit 112, stored in the first memory 111, and displayed in the left area of the screen of the image display unit 190. On the other hand, the original image P0 input into the magnified-image output unit 120 is magnified by the magnification processing unit 122, and stored in the second memory 121.

It is assumed that a combined radiographic image information P' including a previously-measured image Q2 which covers substantially the same region of the same object as the object image Q1 is stored in storage medium 3, where visible information indicating a plurality of measurement reference points based on which the previously-measured image Q2 has been measured is embedded in the previously-measured image Q2. Hereinafter, a measurement reference point based on which the previously-measured image Q2 has been measured is referred to as a previously-set measurement reference point.

The display control unit 180 reads the above combined radiographic image information P1 corresponding to the object image Q1 from the storage medium 3. For example, it is possible to use an ID code of a patient as the object of the object image Q1 or patient information including the name, the gender, the birthday, and the like of the patient for searching for the combined radiographic image information P' corresponding to the object image Q1 in the storage medium 3. Then, the display control unit 180 displays the previously-measured image Q2 included in the combined radiographic image information P' in the upper right area of the screen of the image display unit 190. At this time, the visible information indicating the plurality of previously-set measurement reference points based on which the previously-measured image Q2 has been measured and an order of setting of the plurality of measurement reference points is superimposed on the previously-measured image Q2, as indicated with the encircled numbers "1" and "2" in FIG. 2.

Thereafter, when the user manipulates the mouse 141 so as to instruct the radiographic-image measurement apparatus 1 to automatically set a plurality of measurement reference points for measuring at least one geometric feature of the object image Q1, the measurement-reference-element setting unit 145 refers to the position information indicating positions of the plurality of previously-set measurement reference points based on which measurement of the previously-measured image Q2 corresponding to the object image Q1 has been made, the setting order information which indicates an order of setting of the plurality of previously-set measurement reference points, and the image data representing the object image Q1. Then, the measurement-reference-element setting unit 145 automatically sets a plurality of measurement reference points for measuring at least one geometric feature of the object image Q1 in the same order as the order of setting of the plurality of previously-set measurement reference points, based on the above position information, the setting order information, and the image data representing the object image Q1.

Before the plurality of measurement reference points are automatically set, the object image Q1 and the previously-measured image Q2 are aligned by using one of known methods such as an affine transformation, which realizes translation and rotation.

Figure 4:
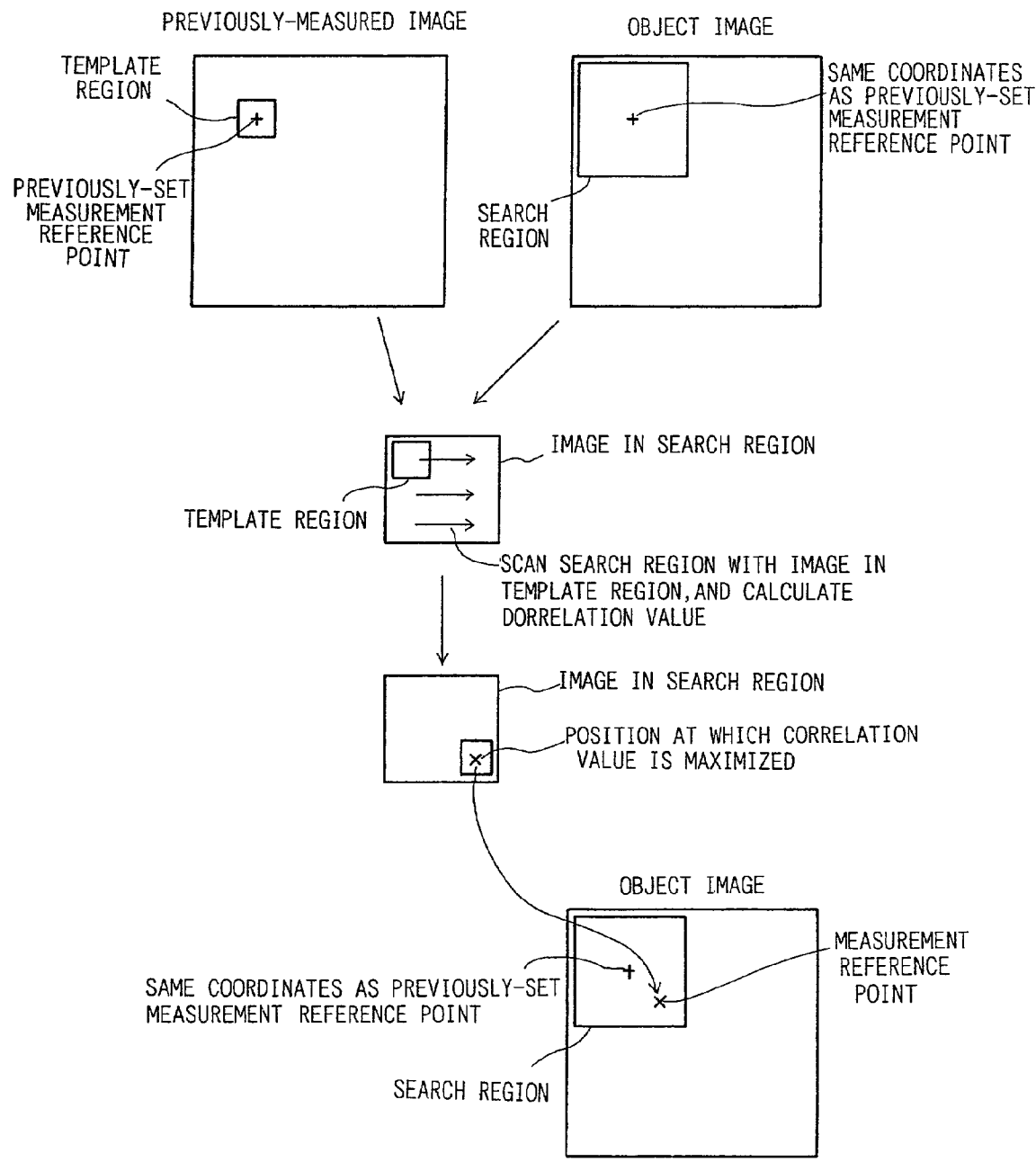
FIG. 4 is a diagram illustrating a sequence of operations in an example of the pattern matching processing.

Next, a previously-produced magnified partial image including a vicinity of each previously-set measurement reference point is cut out from the previously-measured image Q2, and the position of a measurement reference point on the object image Q1 corresponding to the previously-set measurement reference point is searched for by using pattern matching. In the pattern matching, it is possible to use the method utilizing correlation values between two images, which is disclosed in Japanese Unexamined Patent Publication No. 2001-008099, the contents of which are incorporated in this specification by reference. Specifically, the pattern matching processing is performed as illustrated in FIG. 4, which is a diagram illustrating a sequence of operations in the pattern matching processing.

That is, a template region having a predetermined size and including a previously-set measurement reference point on the previously-measured image Q2 is cut out. Then, a search region (region of interest) which is greater than the template region and centered at a point having the same coordinates as the previously-set measurement reference point is determined in (or cut out from) the object image Q1, i.e., a search region image is cut out from the object image Q1. The search region can be set by the user's manipulation of the mouse 141 so as to include the point having the same coordinates as the previously-set measurement reference point.

Next, the image of the template region is moved over the search region so that the search region is scanned with the image of the template region, and a correlation value between the image of the template region and the image of a portion of the search region under each position of the image of the template region during the scanning is calculated. Then, a position of the image of the template region during the scanning at which the correlation value is maximized is determined, and a point on the object image Q1 corresponding to the previously-set measurement reference point on the image of the template region which is at the position maximizing the correlation value is set as a measurement reference point on the object image Q1.

The information on the measurement reference point automatically set as above is supplied to the entire-image output unit 110, the magnified-image output unit 120, and the geometric-feature measurement unit 150. Since the pattern matching processing is performed between the regions smaller than the entire object image Q1 or the entire previously-measured image Q2, the amount of processed data is small, and therefore the pattern matching processing can be performed in a short time.

When a plurality of measurement reference points corresponding to all of the plurality of previously-set measurement reference points which have been set on the previously-measured image Q2 are obtained as above, the first cross-shaped cursor C1 is displayed at the position of each of the plurality of measurement reference points on the reduced image P1 on the screen of the image display unit 190, for example, as illustrated in FIG. 2, in which each of two measurement reference points K2 and K3 is pointed to by the first cross-shaped cursor C1.

Thus, when the automatic setting of the plurality of measurement reference points is completed as above, the user can determine whether or not the plurality of measurement reference points displayed on the screen of the image display unit 190 are appropriate. The determination can be made based on either the reduced image P1 or the magnified partial images P2 and P3.

When the user determines that the plurality of measurement reference points displayed on the screen are appropriate, the user can manipulate the mouse 141 so as to instruct the radiographic-image measurement apparatus 1 to start measurement. On the other hand, when the user determines that the plurality of measurement reference points displayed on the screen are not appropriate, the user can manipulate the mouse 141 so as to change the operation mode of the radiographic-image measurement apparatus 1 to a measurement-reference-element modification mode, in which the user can modify the position of each measurement reference point displayed on the screen, by manipulation of the mouse 141 as described below.

Initially, the mode of movement of the first and second cross-shaped cursors C1 and C2 is in the designation mode M1, in which the second cross-shaped cursor C2 on each of the magnified partial images P2 and P3 automatically moves with the movement of the first cross-shaped cursor C1. The magnified-image output unit 120 obtains by calculation a point on the magnified original image P0 stored in the second memory 121 corresponding to a candidate for the first measurement reference point K2 which is pointed to by the first cross-shaped cursor C1 on the reduced image P1, and controls the image display unit 190 so as to display a portion of the magnified original image P0 including a vicinity of the obtained point, as the magnified partial image P2 in the lower right area of the screen of the image display unit 190. For example, the magnification ratio of the magnified original image P0 is four.

In this case, when the user manipulates the mouse 141 so as to move the first cross-shaped cursor C1 on the reduced image P1, the magnified partial image P2 is scrolled by a multiple of (e.g., four times) the amount of the movement of the first cross-shaped cursor C1. Then, when the user points to a point in a vicinity of the first measurement reference point K2 on the reduced image P1 with the first cross-shaped cursor C1 by manipulation of the mouse 141, a magnified partial image P2 (i.e., a portion of the magnified original image P0) including the first measurement reference point K2 is displayed in the lower right area of the screen of the image display unit 190. Next, when the user manipulates the mouse 141 so that the mode switch unit 142 changes the mode of movement of the first and second cross-shaped cursors C1 and C2 to the setting mode M2, the locking of the second cross-shaped cursor C2 is released.

In the setting mode M2, the user moves the second cross-shaped cursor C2 by manipulation of the mouse 141 in order to position the second cross-shaped cursor C2 on the first measurement reference point K2 on the magnified partial image P2. At this time, the first cross-shaped cursor C1 on the reduced image P1 moves with the movement of the second cross-shaped cursor C2 by an amount which is smaller than the amount of the movement of the second cross-shaped cursor C2. Since the magnified partial image P2 has a higher resolution than the reduced image P1 (e.g., four times the resolution of the reduced image P1), the user can accurately position the second cross-shaped cursor C2 on the first measurement reference point K2 on the magnified partial image P2.

When the user confirms that the second cross-shaped cursor C2 is positioned on the first measurement reference point K2, the user can manipulate the mouse 141 so as to input into the magnified-image output unit 120 a command to fix the setting of the measurement reference point. When the magnified-image output unit 120 receives the command, the magnified-image output unit 120 supplies to the geometric-feature measurement unit 150 information on the position of the measurement reference point on the partial image P2, and fixes the display of the partial image P2.

Subsequently, the user can set or modify and fix the position of the second measurement reference point K3 in a similar manner to the manner in which the first measurement reference point K2 is set and fixed. For example, the magnified-image output unit 120 obtains by calculation a point on the magnified original image P0 stored in the second memory 121 corresponding to a candidate for the second measurement reference point K3 which is pointed to by the first cross-shaped cursor C1 on the reduced image P1, and controls the image display unit 190 so as to display a portion of the magnified original image P0 including a vicinity of the obtained point, as the magnified partial image P3 in the lower right area of the screen of the image display unit 190. For example, the magnification ratio of the magnified original image P0 is four.

Further, a symbol indicating each magnified partial image is displayed near a measurement reference point on the reduced image P1 corresponding to the magnified partial image when the user manipulates the mouse 141 for modifying a measurement reference point. In the example of FIG. 2, the symbols "P2" and "P3" are respectively displayed near the first and second measurement reference points K2 and K3 on the reduced image P1. Thus, the positions of the first and second measurement reference points K2 and K3 can be roughly indicated.

After the measurement reference points which are necessary for the measurement are automatically set or modified by the user, the geometric-feature measurement unit 150 calculates a geometric feature (quantity) of the object image Q1 in accordance with a measurement processing algorithm which is stored in advance, and supplies the calculated geometric feature (quantity) as a measurement result to the measurement-result output unit 155. For example, the geometric feature (quantity) is a distance between predetermined ones of the measurement reference points.

The measurement-result output unit 155 controls the image display unit 190 so as to display the measurement result on the screen. In the example of FIG. 2, the geometric quantity "220.5" as the measurement result is displayed on the reduced image P1.

When the measurement processing is completed, the entire reduced image P1 and the magnified partial images P2 and P3, which are displayed on the screen of the image display unit 190 and constitute the aforementioned radiographic image information P, are supplied from the entire-image output unit 110 and the magnified-image output unit 120 to the radiographic-image storage apparatus 2. In addition, information on the positions of the first and second measurement reference points K2 and K3 on the magnified partial images P2 and P3, the measurement result (e.g., the value "220.5"), and information on the order of the setting of the measurement reference points, which constitute the aforementioned measurement result information J, are supplied from the geometric-feature measurement unit 150 to the radiographic-image storage apparatus 2. For example, the information on the positions of the first and second measurement reference points K2 and K3 may be image information for displaying a dot "." and characters "K2" or "K3" on each of the magnified partial images P2 and P3.

The measurement-result-information storage unit 20 in the radiographic-image storage apparatus 2 combines the radiographic image information P and the measurement result information J to generate combined radiographic image information P' in which the position information is linked with the radiographic image information P, and stores the combined radiographic image information P' in the storage medium 3. The combined radiographic image information P' stored in the storage medium 3 can be used for generating a previously-measured image or setting order information in measurement of the next object image.

Advantages of Embodiment

As explained above, the radiographic-image measurement apparatus 1 as an embodiment of the present invention can automatically set at least one measurement reference element (e.g., a plurality of measurement reference points) on an object image Q1 in an appropriate order so that the at least one measurement reference element (e.g., the plurality of measurement reference points) on an object image Q1 corresponds to at least one previously-set measurement reference element (e.g., a plurality of previously-set measurement reference points) which has been set on a previously-measured image Q2. Therefore, it is possible to efficiently make automatic measurement of a geometric feature (quantity) of the object image Q1.

In addition, the previously-measured image Q2 is displayed in the vicinity of the object image Q1, and at least one previously-set measurement reference element (e.g., a plurality of previously-set measurement reference points) are displayed on the previously-measured image Q2. Therefore, when the object image Q1 is measured, the user can easily and accurately recognize which region of the previously-measured image Q2 has been measured and whether or not at least one position of the at least one measurement reference element (e.g., a plurality of measurement reference points) automatically set on the object image Q1 are appropriate. Thus, the user can accurately modify and set the at least one measurement reference element (e.g., a plurality of measurement reference points) on the object image Q1 corresponding to the at least one previously-set measurement reference element (e.g., the plurality of previously-set measurement reference points).

Further, in the radiographic-image measurement apparatus 1, the entire reduced image P1 and the magnified partial image P2 and the like are concurrently displayed on the same screen of the image display unit 190. The display of the entire reduced image P1 facilitates recognition of the relative positions of the measurement reference point K2 and the like, and the display of the magnified partial image P2 and the like facilitates accurate setting of the measurement reference point K2 and the like. In particular, regions which are roughly designated on the object image Q1 with the first cross-shaped cursor C1 can be displayed as the magnified partial image P2 and the like. Therefore, the user can accurately modify the measurement reference point K2 and the like on the magnified partial image P2 and the like based on accurate recognition of the relative positions of the measurement reference point K2 and the like. Since the measurement reference points can be accurately set, the measurement can also be accurately made.

Example of Measurement

Details of an example of processing for setting at least one measurement reference point and obtaining a geometric feature (quantity) of an object by calculation are explained below. In the following examples, the geometric feature (quantity) is a cardio-thoracic ratio.

When an object image Q1' of a chest is input into the radiographic-image measurement apparatus 1 as an original radiographic image P0, and the user inputs a command to automatically set a plurality of measurement reference points, the measurement-reference-element setting unit 145 automatically set the plurality of measurement reference points on the object image Q1' based on image data representing the object image Q1' and position information indicating a plurality of positions of a plurality of previously-set measurement reference points which have been set on a previously-measured image Q2' corresponding to the object image Q1'. The previously-measured image Q2' covers the same object as the object image Q1', and has been taken in advance of the object image Q1'. In addition, the storage medium 3 stores combined radiographic image information P1 in which visible information indicating the plurality of previously-set measurement reference points are embedded in the previously-measured image Q2'.

When the user inputs the command to automatically set plurality of measurement reference points, the combined radiographic image information P' which includes the previously-measured image Q2' covering the same object as the object image Q1' is read out from the storage medium 3 based on an ID code of the object of the object image Q1 or the like, and is then supplied to the measurement-reference-element setting unit 145 for use in the processing for automatic setting of the plurality of measurement reference points. Before the automatic setting of the plurality of measurement reference points, the object image Q1' and the previously-measured image Q2' are roughly aligned to each other by using the affine transformation or a rough alignment technique which is disclosed in Japanese patent application No. 2001-129554, the contents of which are incorporated in this specification by reference.

Figure 5A:
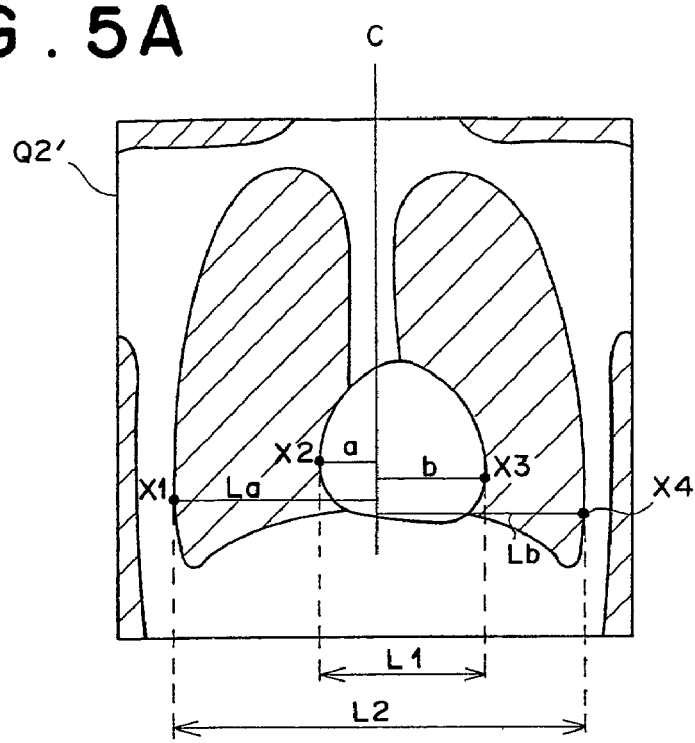
FIG. 5A is a diagram illustrating examples of previously-set measurement reference points which are set on a previously-measured image for measurement of a cardio-thoracic ratio.
Figure 5B:
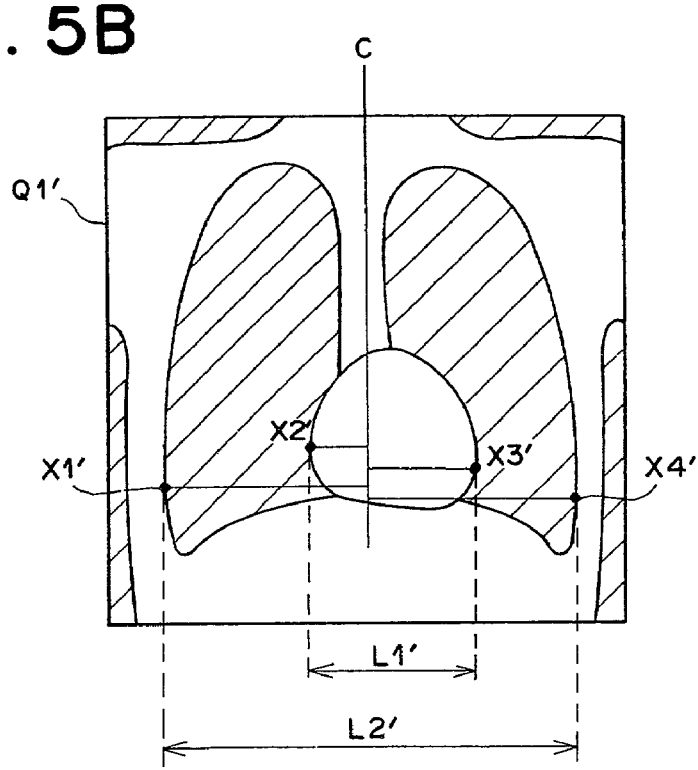
FIG. 5B is a diagram illustrating examples of measurement reference points which are automatically set on an object image for measurement of a cardio-thoracic ratio.

The plurality of previously-set measurement reference points set on the previously-measured image Q2' are points based on which the cardio-thoracic ratio is measured. Specifically, as illustrated in FIG. 5A, two previously-set measurement reference points X1 and X4 are set for determining the maximum distance (L2=La+Lb) between the right and left ribcage edges (i.e., the maximum diameter of the ribcage), and two other previously-set measurement reference points X2 and X3 are set for determining the maximum distance (L1=a+b) between the right and left edges of the heart (i.e., the maximum diameter of the heart). The measurement-reference-element setting unit 145 searches for an edge in a vicinity of a position on the object image Q1' corresponding to each of the previously-set measurement reference points X1 to X4, and automatically sets measurement reference points X1' and X4' on the object image Q1' for determining the maximum distance L2' between the right and left ribcage edges (i.e., the maximum diameter of the ribcage), and other measurement reference points X2' and X3' for determining the maximum distance L1' between the right and left edges of the heart (i.e., the maximum diameter of the heart), as illustrated in FIG. 5B. The above operations of the measurement-reference-element setting unit 145 are performed based on the position information indicating the previously-set measurement reference points X1 to X4 set on the previously-measured image Q2' and the image data representing the object image Q1'. In addition, each of the measurement reference points X1' to X4' is positioned at a point on a corresponding one of the right and left ribcage edges and the right and left edges of the heart so that the distance from a center line C to the corresponding edge is maximized at the point, where the center line C is drawn as an approximation of the center line of the spine.

When the processing for automatic setting of the measurement reference points is completed, and the user inputs a command to start the measurement, the geometric-feature measurement unit 150 calculates the cardiothoracic ratio (L1'/L2') based on information on the positions of the measurement reference points X1' to X4' in accordance with a measurement processing algorithm which is stored in advance, and supplies the calculation result to the measurement-result output unit 155.

According to the above processing, an edge is searched for in a vicinity of a point on the object image Q1' corresponding to each of the previously-set measurement reference points X1 to X4 set on the previously-measured image Q2'. Since the search range is limited to the vicinity of the point corresponding to each of the previously-set measurement reference points, it is possible to accurately find the edges on which the measurement reference points X1' to X4' are to be set for calculation of the cardio-thoracic ratio, in a short time. That is, the efficiency of the processing for calculation of the cardio-thoracic ratio is increased.

Alternatively, the above measurement reference points X2' and X3', which are used for determining the maximum diameter L1' of the heart, may be set in the following way.

First, the object image Q1' and the previously-measured image Q2' are also roughly aligned to each other.

Figure 6:
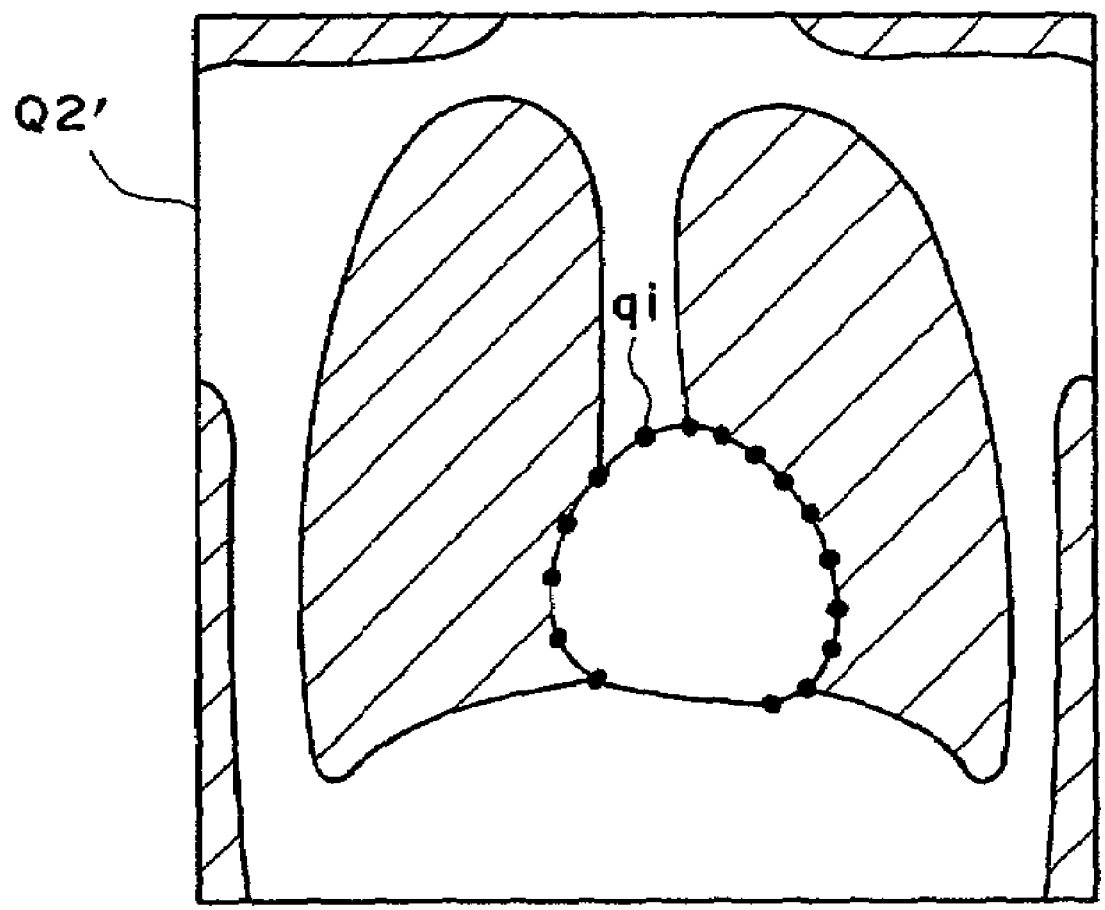
FIG. 6 is a diagram illustrating an example of a heart shadow template set on a radiographic chest image.

Then, a heart shadow template as a measurement reference element is set on the previously-measured image Q2'. The heart shadow template is a template enclosed by a curve determined by n constituent points qi (i=1 to n) which are set along the contour of the heart image in the previously-measured radiographic image Q2', for example, as illustrated in FIG. 6. In this case, the measurement-reference-element setting unit 145 searches for an edge in a vicinity of a position on the object image Q1' corresponding to each of the n constituent points qi, based on the image data representing the object image Q1' and position information indicating the positions of the n constituent points qi set on the previously-measured image Q2'. When the measurement-reference-element setting unit 145 fails to find an edge in a vicinity of a position on the object image Q1' corresponding to one of the n constituent points qi, the measurement-reference-element setting unit 145 estimates the shape of the edge based on an assumption that the edge of the heart image in the object image Q1' has a shape analogous to that of the heart image in the previously-measured image Q2'. Thus, the measurement-reference-element setting unit 145 sets the measurement reference points X2' and X3' which determine the maximum diameter L1' of the heart in the object image Q1'.

Since a shape of an edge is estimated based on the heart shadow template in a vicinity of a position on the object image Q1' corresponding to a constituent point qi when the measurement-reference-element setting unit 145 fails to find the edge in the vicinity of the position, it is possible to accurately set the measurement reference points X2' and X3' even when the contour of the heart shadow is partially unclear in the object, image Q1'. In particular, when the object has a disease, the contour of the heart shadow is likely to be partially unclear. Therefore, when the measurement reference points are set as above, it is possible to support the diagnosis more effectively.

Variations of Embodiment (i) Although the radiographic-image measurement apparatus 1 as the above embodiment allows the user to modify at least one measurement reference element on the object image after the automatic setting, alternatively, the radiographic-image measurement apparatus 1 may be arranged to automatically make the measurement of the geometric feature (quantity) immediately after the automatic setting of the at least one measurement reference element.

(ii) Although, in the above embodiment, a geometric feature (quantity) of the object image Q1 is automatically calculated in accordance with the measurement processing algorithm which is stored in advance, alternatively, the radiographic-image measurement apparatus 1 may be arranged to receive the user's designation of a geometric feature (quantity) to be measured (e.g., a distance between two points, an angle between two lines, or the like) after the automatic setting of at least one measurement reference point, and make the measurement in accordance with the user's designation.

(iii) Although, in the above embodiment, a previously-measured image which covers the same region of the same object as the object image is used as a measurement reference image, any other image which provides reference information for automatic setting of at least one measurement reference element on the object image can be used. For example, a typical image of the same body part as that covered by the object image may be used as a measurement reference image. That is, when the number of the at least one measurement reference element is small, it is not necessary that the measurement reference image is an image of the same region of the same object as the object image.

(iv) In the above embodiment, when the measurement result is supplied to the measurement-result output unit 155, the measurement-result output unit 155 displays only the value of the measured geometric quantity on the screen of the image display unit 190 as mentioned before. Alternatively, the measurement-result output unit 155 may display a result of diagnosis of disease progression as well as the measured geometric quantity. For example, when the cardio-thoracic ratio is measured, it is possible to make an automatic diagnosis of disease progression. In this case, a result of diagnosis of disease progression (e.g., "improved," "deteriorated," or "not changed") may be displayed as well as the measured geometric quantity (e.g., "0.5" or "50%").

(v) Although at least one result of previous measurement is necessary for the diagnosis of disease progression, the result of the previous measurement can be calculated as needed, based on the combined radiographic image information P' which includes the measurement result information J and is stored in the storage medium 3. Alternatively, it is possible to store in advance at least one result of previous measurement in the storage medium 3 together with the combined radiographic image information P', and read out the result of the previous measurement from the storage medium 3 when it is necessary for the diagnosis of disease progression.

Additional Matters (i) Although the object image Q1 and the object image Q1' are radiographic images in the above embodiment, images which can be handled by the measurement processing apparatus according to the present invention are not limited to radiographic images, and include any images on which a geometric feature (quantity) is measured.

What is claimed is:

1. A measurement processing apparatus for measuring a geometric feature of an object image, comprising:
 a measurement-reference-element setting unit which automatically sets at least one first measurement reference element for use in measurement of said geometric feature of said object image, at at least one first position on said object image based on first image data representing the object image and position information indicating at least one second position of at least one second measurement reference element which is set on a measurement reference image corresponding to the object image; and a geometric-feature measurement unit which measures said geometric feature of said object image based on said at least one first position of said at least one first measurement reference element.

2. A measurement processing apparatus according to claim 1, wherein said measurement-reference-element setting unit sets in advance a region of interest at a third position on said object image corresponding to each of said at least one second position, and automatically sets one of said at least one first measurement reference element in said region of interest.

3. A measurement processing apparatus according to claim 1, wherein said measurement-reference-element setting unit aligns in advance said object image with said measurement reference image before the measurement-reference-element setting unit automatically sets said at least one first measurement reference element.

4. A measurement processing apparatus according to claim 1, further comprising a storage unit which stores said position information and second image data representing said measurement reference image in a predetermined storage medium so that the position information is linked with the second image data, wherein said measurement-reference-element setting unit reads out said position information and the second image data from said predetermined storage medium, and automatically sets said at least one first measurement reference element based on said second image data as well as said first image data and said position information.

5. A measurement processing apparatus according to claim 1, wherein said measurement-reference-element setting unit obtains a first portion of said object image corresponding to a second portion of said measurement reference image located in a vicinity of each of said at least one second measurement reference element by using pattern matching processing, and automatically sets each of said at least one first measurement reference element at a position on said first portion of the object image corresponding to one of said at least one second measurement reference element.

6. A measurement processing apparatus according to claim 1, wherein said measurement-reference-element setting unit searches for an edge in a vicinity of a third position on the object image corresponding to each of said at least one second measurement reference element, and automatically sets each of said at least one first measurement reference element based on information on the edge.

7. A measurement processing apparatus according to claim 1, wherein said measurement reference image is an image on which said geometric feature has been previously measured.

8. A measurement processing apparatus according to claim 1, wherein each of said object image and said measurement reference image is a chest image, and said geometric feature is a cardio-thoracic ratio.

* * * * *